Figure 1:
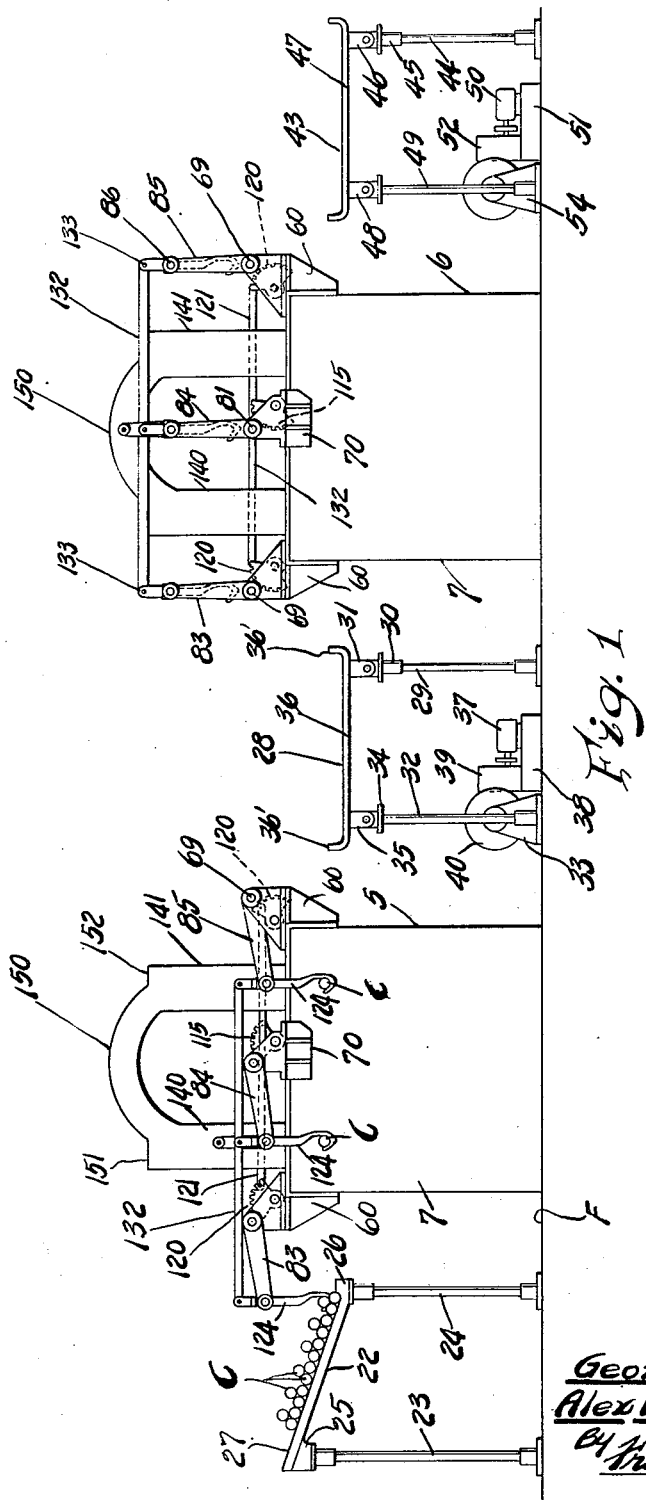

March 29, 1955

G. A. KENDALL ET AL 2,704,955

AUTOMATIC TRANSFERRING MECHANISM

Filed Oct. 14, 1950

5 Sheets-Sheet 4

INVENTORS.
George A. Kendall.
Alex W. Chriscaden.
By Frank C. Fearman.
ATTORNEY

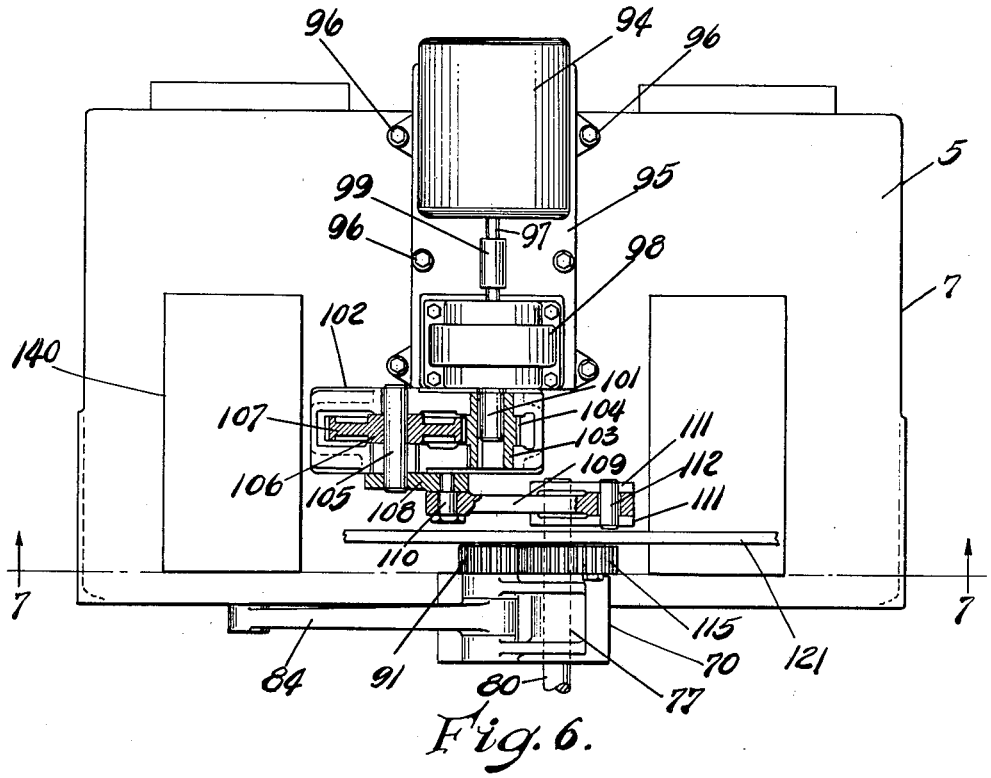
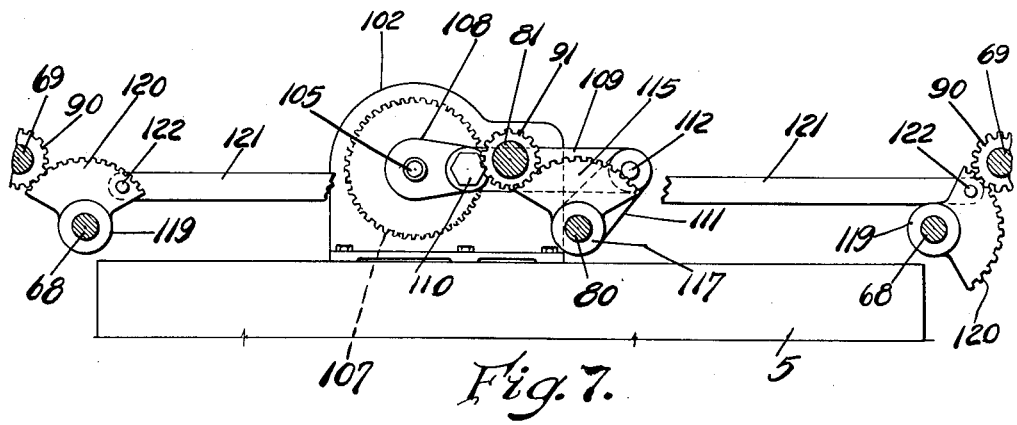

United States Patent Office 2,704,955
Patented Mar. 29, 1955

2,704,955

AUTOMATIC TRANSFERRING MECHANISM

George A. Kendall and Alex W. Chriscaden, Saginaw, Mich., assignors to Wickes Bros., a division of The Wickes Corporation, Saginaw, Mich.

Application October 14, 1950, Serial No. 190,132

21 Claims. (Cl. 82—2.5)

The present invention relates to automatic mechanism for crankshaft turning lathes, and more particularly to an apparatus for progressively loading and unloading crankshafts and other work pieces successively to a series of automatic dual turning lathes.

One object is to provide a mechanism for progressively loading and unloading a series of crankshaft lathes arranged along a work pathway for transferring the work pieces to and from the plural sets of lathe spindles, and also between adjacent turning lathes along said pathway in a rapid and efficient manner so that the crankshafts or work pieces will be rough and finished turned within the correct tolerance allowance.

Another object is to provide a mechanism for progressively loading and unloading a series of crankshaft lathes and to successively transfer the crankshafts from one set of dual lathe spindles to the other set without requiring the use of manual labor, and the necessity of lifting the crankshafts from one turning position to another.

Another object is to provide a crankshaft lathe loading and unloading mechanism in which the crankshafts are transferred to one set of dual spindles and then to another for rough and finished turning, after which the finished crankshaft is unloaded from the machine by a series of oscillating arms which operate in unison so that the work engaging hooks carried thereby will automatically engage the crankshafts during the loading, transfer and unloading operation, as well as during the return stroke for engaging a new work piece and one of the work pieces between one set of dual lathe spindles.

Another object is to provide an automatic loading and unloading apparatus having a plurality of hooked work engaging members which are automatically operated simultaneously to transfer crankshafts and other work pieces from one lathe to another or between loading and unloading stations simultaneous with the transfer of one work piece between one set of spindles of the dual lathe to the other set.

Another object is to provide an automatic transfer mechanism for loading and unloading dual crankshaft lathes in which the work engaging members are positively actuated, and are controlled by a cam track to engage and disengage the work pieces between the loading and unloading stations as well as between the dual spindles of a multiple crankshaft turning lathe.

Another object is to provide an automatic loading and unloading apparatus for transferring crankshafts and other work pieces from one multiple lathe to another, and simultaneously load and unload crankshafts and work pieces to the successive sets of spindles of each multiple lathe.

Another object is to provide an automatic loading and unloading apparatus for transferring crankshafts and other work pieces to a series of multiple spindle lathes, as well as to the sets of spindles of the lathes successively by vertically swinging arms which are arranged to travel rapidly as they approach the loading and unloading positions and to travel slowly as they approach the limits of their loading and unloading positions, thus enabling the work pieces to be turned and carefully picked up and deposited during the loading and unloading cycles of the apparatus.

Another object is to provide an automatic loading and unloading apparatus for transferring crankshafts and other work pieces to a series of multi-spindle lathes arranged along a work pathway so that the work pieces may be transferred successively to the lathes, as well as to the multi-spindles of the lathes without requiring the use of lifting devices and hoists for positioning the crankshafts between the different spindles of the series of multi-lathes.

Another object is to provide an automatic loading and unloading apparatus for automatic multi-spindle lathes in which the work pieces are transferred by hooked arms which are actuated to engage and disengage the work pieces in timed relation to eliminate the use of spring grips or other unreliable mechanisms, which upon failure drop the work piece and cause damage to the transfer mechanism.

Other objects and advantages of the invention will become apparent during the course of the following description of the accompanying drawings wherein:

Figure 1 is a side elevational view of the loading and unloading mechanism showing the same applied to a pair of multiple spindle crankshaft lathes which are shown in end elevation with the loading and unloading apparatus arranged to successively load and unload the lathes and simultaneously transfer the work pieces between the successive spindles of the multiple lathes.

Figure 2:
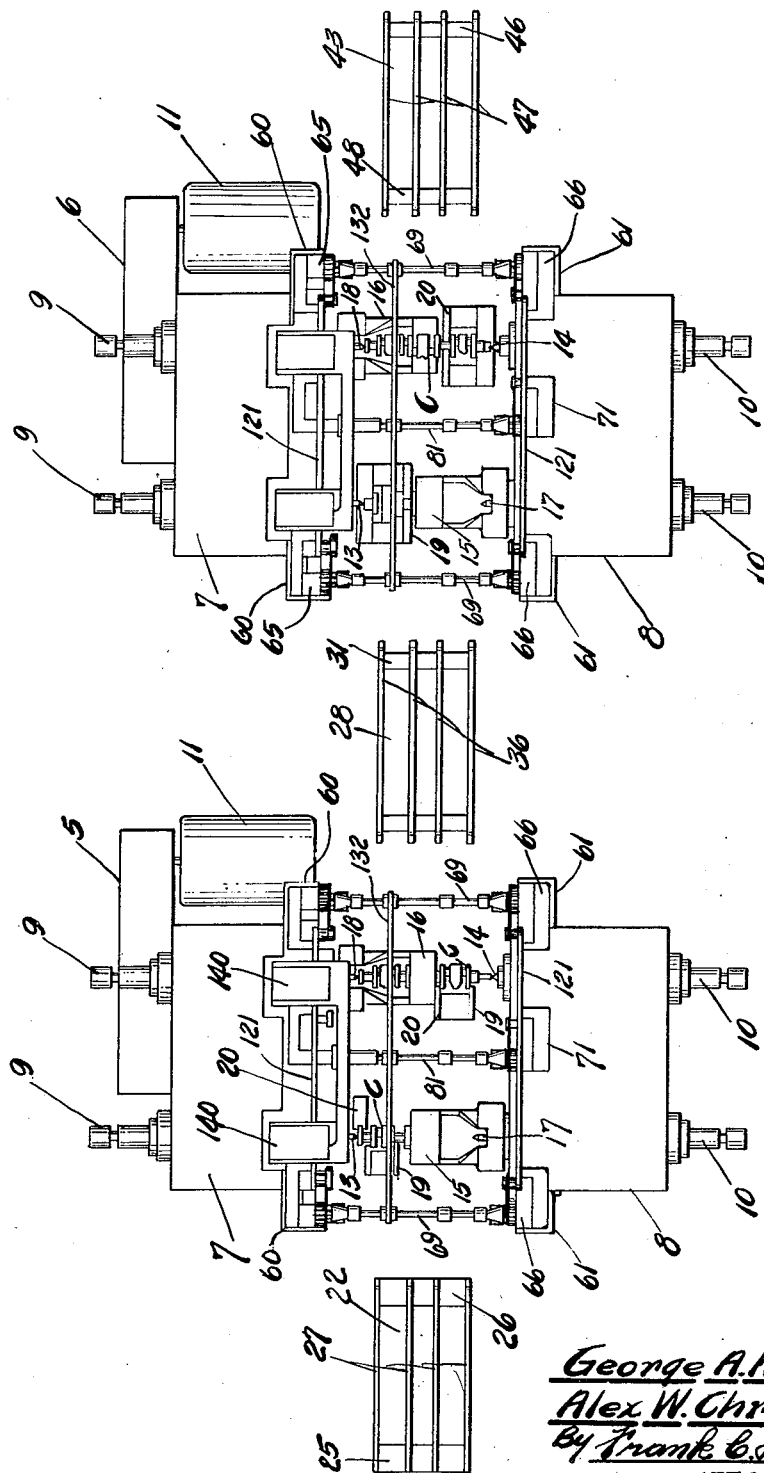

Figure 2 is a top elevational view showing a pair of multiple spindle lathes with the transfer mechanism attached thereto for loading the first lathe from a loading station to the lathe, successively to the spindles of the lathe, and then to an unloading station where they are picked up by the loading and unloading mechanism on the second multiple spindle lathe for being transferred to the spindles thereof and finally deposited on an unloading rack.

Figure 3:
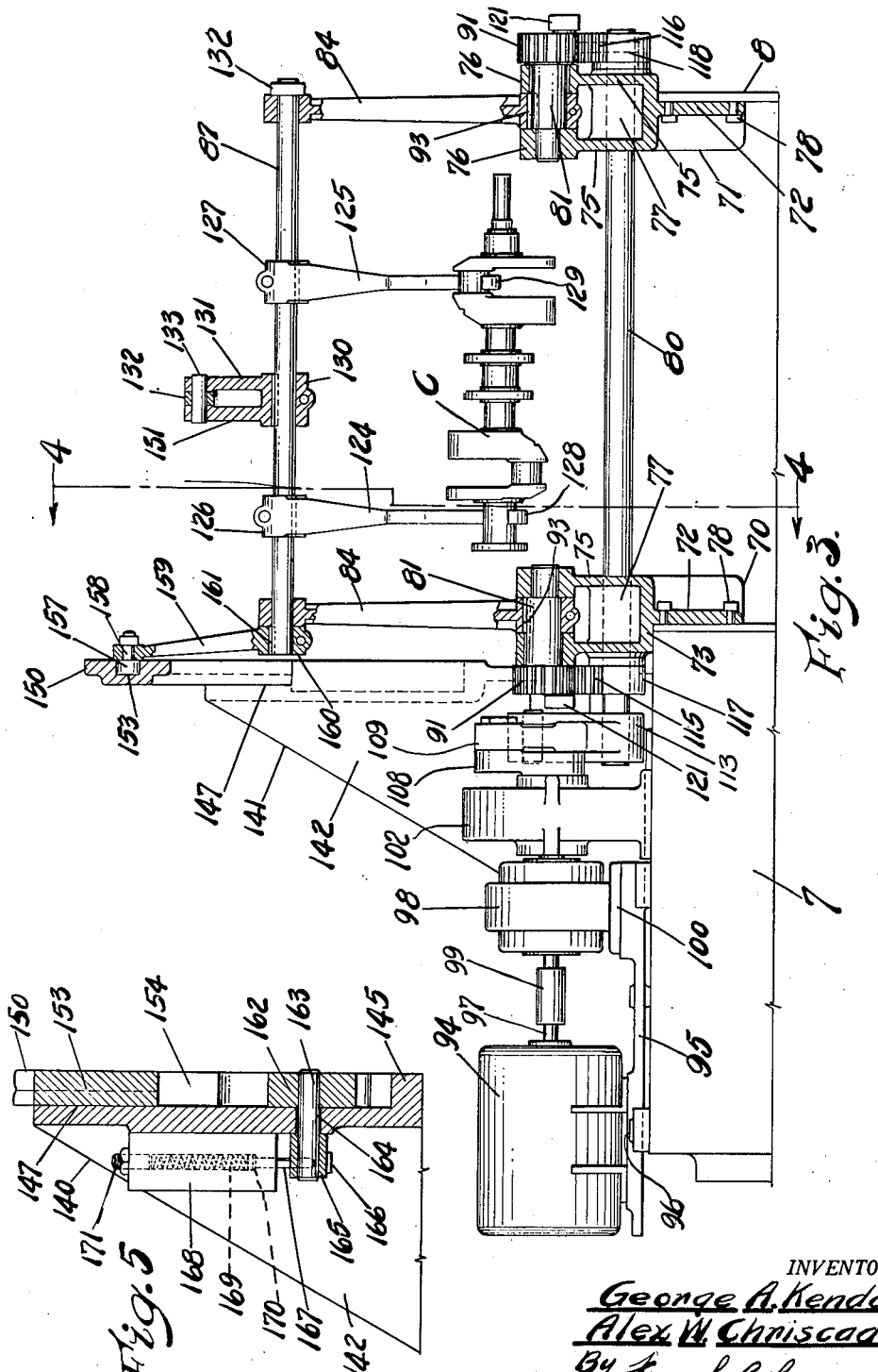

Figure 3 is a front elevational view of a multiple spindle lathe showing the head stock end, and illustrating the drive mechanism for the crankshaft transfer apparatus. Portions of the transfer apparatus are shown in section and the oscillating arms are illustrated in their uppermost position with the transfer hooks supporting a crankshaft in an intermediate position.

Figure 4:
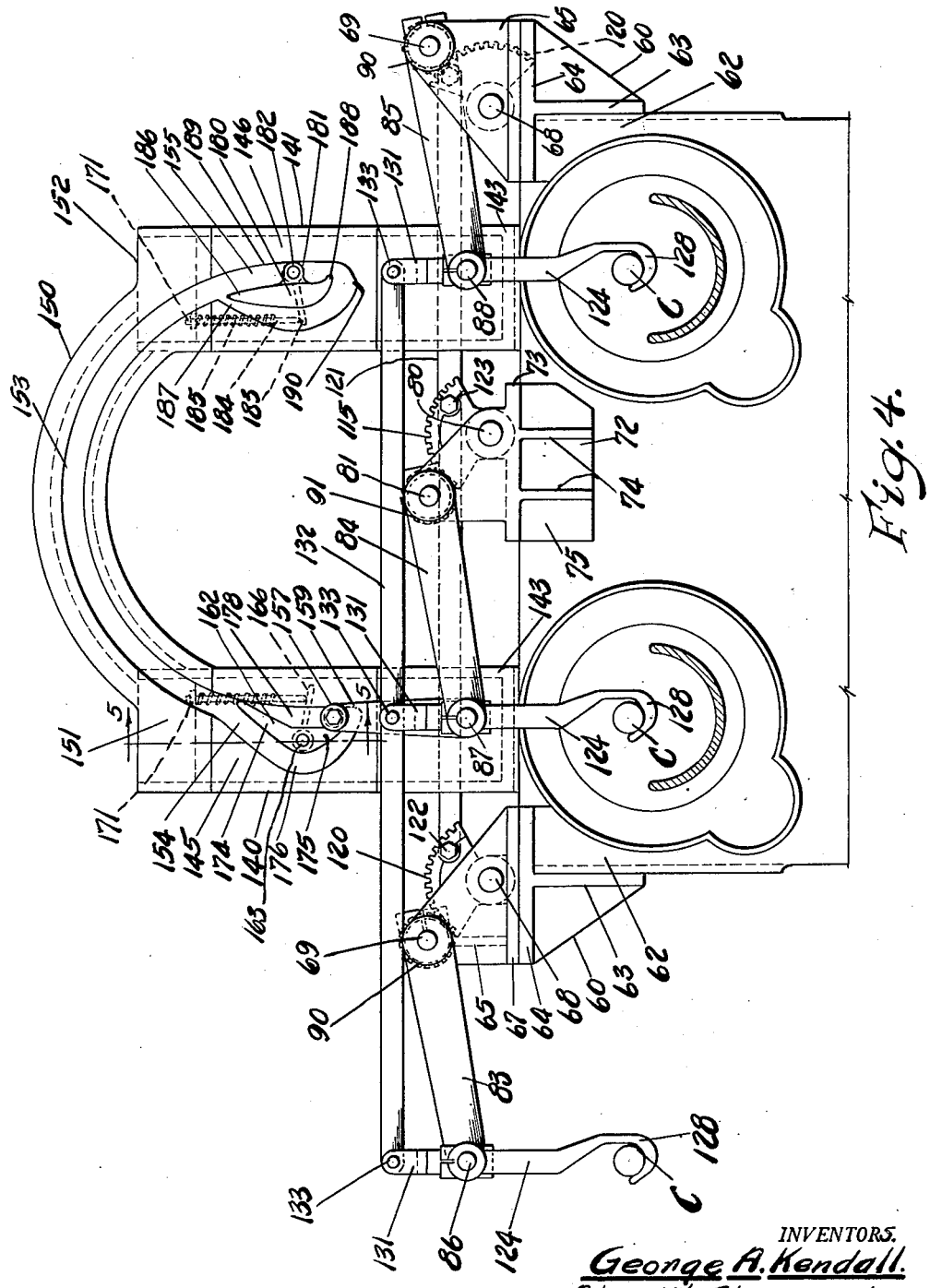

Figure 4 is a vertical cross-sectional view taken on line 4—4 of Figure 3 and showing the crankshaft transfer mechanism with the oscillating arms connected for operation in unison, and the work engaging hooks likewise connected to travel in parallel relation until the oscillating arms reach the limits of their travel, at which time the hooks are tripped by cam tripping mechanism at each end of the cam guide slot.

Figure 5 is an enlarged fragmentary vertical cross-sectional view taken on line 5—5 of Figure 4 and looking in the direction of the arrows to illustrate various structural details of one of the cam track tripping or switching members.

Figure 6 is an enlarged top elevational view of the head stock end of one of the multiple lathes showing the transfer mechanism removed, with the exception of one of the oscillating arms and illustrating the drive mechanism for oscillating the transfer arms at a reduced speed, and Figure 7 is a vertical longitudinal cross-sectional view taken on line 7—7 of Figure 6 and looking in the direction of the arrows to further illustrate the drive gearing and mechanical movement of converting rotary uni-directional movement to oscillating motion through a quadrant gear and crank mechanism.

In the drawings, and more in detail, attention is first directed to Figures 1 and 2, wherein there is shown for the purpose of convenience of illustration a pair of multi-spindle lathes generally designated 5 and 6 which are arranged in spaced relation. The multi-spindle lathes 5 and 6 are of the automatic type and are designed for rough annd finish turning crankshafts and similar work pieces, and each lathe includes a head stock 7 and a tail stock 8 having spindles 9 and 10 respectively which are adapted to be driven by means of an electric motor 11. The spindles 9 and 10 are provided with work engaging centers 13 and 14 respectively which are adapted to be automatically retracted and projected by suitable mechanism (not shown).

Each of the lathes 5 and 6 is provided with crankshaft chucking devices 15 and 16 opposed to the center spindles 13 and 14, and said chucking devices are constructed and arranged to receive a crankshaft therebetween as at C to hold and grip the same in substantially the same manner as a driver of a conventional lathe. The chucking devices 15 and 16 are provided with center spindles 17 and 18 which are mounted directly opposite their cooperating spindles or centers 13 and 14. Cutting tools are supported to engage various portions of the crankshafts as indicated at 19 and 20.

While there is shown a pair of automatic latches having dual spindles, it is to be understood, that multi-spindle lathes may be employed having sets of spindles in excess thereof, depending upon the number of turning operations to be performed on a particular work piece. For instance, as shown in Figure 2, the set of spindles 13 and 17 of the lathe 5 are adapted to first turn the bearings and flange at one end of the crankshaft C roughly and the cutting tools 19 in between the center 14 and 18 of the lathe 5 are positioned to rough turn the cheek and bearings at the opposite end of the crankshaft. Similarly, the tools 19 and 20 presented to work between the centers 13 and 17 of the automatic lathe 6 are positioned to rough turn the fillet, bearings and flange at one end of the crankshaft, while the crankshaft C between the centers 14 and 18 of the lathe 6 is adapted to be operated upon by the tools 19 and 20 to rough turn the fillet, bearings and stub of the opposite end of the crankshaft. By providing additional lathes (not shown) the crankshaft can be finish turned by suitable tools so designed as to provide smooth bearing surfaces for the various portions of the crankshaft.

The head and tail stocks 7 and 8 respectively of the lathes 5 and 6 are formed of relatively heavy castings which house the gearing and spindle retracting mechanisms, as well as stop controls for positioning the crankshaft engaging chucks 15 and 16 with their mouths uppermost for receiving the work. Usually, the chucking devices 15 and 16 include separable jaw members which are moved apart and into engagement with the work through suitable control linkage (not shown).

The work engaging chucks are best illustrated in Figure 2, and it will be seen, that the work such as crankshafts and the like may be positioned between the centers of the lathes when the mouths of the chucking devices are uppermost.

Mounted to the left (Figures 1 and 2) of the crankshaft lathe 5 is a work loading station or table 22 which is formed by pairs of uprights 23 and 24 bolted or otherwise secured to the floor F by the flanged feet thereof. The upper ends of the standards 23 and 24 are connected by bars 25 and 26 (Figure 2), and connecting the bars 25 and 26 is a series of rack bars 27 which are inclined downwardly in the direction of the lathe 5. The rack bars 27 are adapted to receive crankshafts C (Figure 1), and the inclined rack bars 27 are spaced to engage at least four of the crankshaft throws or connecting rod bearings such that the crankshafts will be positioned correctly for transfer to the multi-spindle lathe 5. The rack bars 27 in addition to holding the crankshafts in a correct circumferential position, also retain the crankshafts in their correct longitudinal position to insure the same being alined between the centers 13 and 17 of the lathe 5. This arrangement insures the proper positioning of the crankshafts C so that they will be properly received between the centers 13 and 17, and will enter the chucking device 15 when the lathe comes to rest with the mouth of the chucking device uppermost.

Similarly, an unloading and loading rack 28 is arranged between the multi-spindle lathes 5 and 6. This rack includes a pair of rigid uprights 29 having their lower flanged ends bolted to the floor F, and their upper ends provided with a fitting 30 on which is rockably mounted a support 31 (Figures 1 and 2). The opposite end of the rack 28 is supported by a pair of reciprocating legs 32 which are slidably mounted at their lower ends in a bracket 33, and have their upper ends provided with a fitting 34 to which is rockably mounted a rack supporting bar 35. The rack supporting bars 31 and 35 are connected by rack bars 36 which are spaced one from the other in substantially the same manner as the rack bars 27, so that the crankshaft C when transferred from the lathe 5 will be received in substantially the same position that it assumed on the rack 22. The uprights 32 are adapted to be reciprocated by an electric motor 37 mounted on a base 38 presented to the brackets 33. A gear reduction housing 39 is provided with suitable mechanism for driving a wheel 40 which is provided with an eccentric connection with the uprights 32 (not shown). Thus, the rack 28 may be rocked vertically about the pivot fitting 31 to enable the crankshafts thereon to move in a direction from the crankshaft lathe 5 toward the lathe 6. The ends of the rack bars 36 are curved upwardly as at 36' to prevent the crankshafts from becoming displaced from the rack 28.

An unloading station 43 is provided on the opposite side of the multi-spindle lathe 6 and is arranged to receive crankshafts for being loaded to another lathe (not shown) similar to the lathes 5 and 6. The unloading station 43 is similar to the loading and unloading station 28, and includes a pair of spaced uprights 44 having their flanged lower ends bolted to the floor F as before. The upper ends of the uprights 44 are provided with fittings 45 for rockably supporting a cross bar 46, and attached to said cross bar is one end of a plurality of rack bars 47 arranged in spaced relation identical to the spacing of the rack bars 27 and 36. The other ends of the rack bars 47 are connected by a transverse bar 48 which is reciprocably mounted on the upper ends of a pair of reciprocating uprights 49. Drive mechanism for reciprocating the uprights 49 includes an electric motor 50 mounted on a base 51 with its armature shaft drivingly connected to a gear reduction unit 52, the output shaft of which is provided with an eccentric pin connected to the uprights 49 at both ends thereof by connecting links (not shown). The lower ends of the reciprocating uprights 49 are mounted in the bracket 54 so that the rack 43 will be rocked slowly about the fittings 45, and thus cause the crankshafts deposited on the left end to be moved toward the right end of the rack 43.

Thus, it will be seen that the loading and unloading platforms and multiple spindle lathes 5 and 6 are alternately arranged (Figures 1 and 2), and it will be noted in Figure 1 that the multiple spindle lathes have their tail stock portions 8 removed so that the head stock is only shown to illustrate one side of the transfer mechanism and the manner in which the crankshafts are picked up by the oscillating hooks and arms for transfer progressively through the multiple spindle lathes.

The progressive transfer mechanism is supported between the head and tail stocks 7 and 8 of each lathe 5 and 6, and in order to support the transfer mechanism angle brackets 60 and 61 are attached to the corner portions of the head and tail stocks 7 and 8 respectively. The angle brackets are identical, except that they are reversed for attachment to the opposed walls and upper surface of the head and tail stocks. In Figure 4 the brackets 60 on the head stock 7 include an angle portion 62 which is bolted or otherwise fastened to the inner wall of the head stock, and said angular plate-like portion 62 is provided with a side portion 63 which extends along the sides of the head stock and is likewise bolted thereto by means of threaded fasteners (not shown). A supporting portion 64 integrates the angular portions 62 and 63, and said supporting brackets are adapted to support bearing brackets 65 and 66 which are held in place by flanged portions 67 bolted or fastened to the angle bracket support 64 by suitable machine screws or the like (also not shown). The bearing brackets 65 and 66 are thus disposed at the corner portions of the head and tail stocks 7 and 8, and each bearing bracket includes bearing openings for supporting short shafts 68 and 69. Mounted between the bearing brackets 65 on the head and tail stocks 7 and 8 are opposed brackets 70 and 71 having a depending flange 72 (Figure 4), and an angular portion 73 which extends rearwardly over the upper surface of the head and tail stocks 7 and 8. Re-inforcing ribs 74 are formed on the angle portion 72 of the bearing brackets 70 and 71, and each of the brackets 70 and 71 is formed with spaced walls 75 having bearing bosses 76 and 77 (Figure 3). The bearing bosses 76 are spaced apart, while the bearing boss 77 is cylindrically formed and is integrated with the spaced walls 75. The bearing brackets 70 and 71 are secured to the head and tail stocks 7 and 8 by machine screws or the like 78, (Figure 3). Thus, it will be seen, bearing brackets are disposed alternately with the lathe spindles 9 and 10 of the respective lathes 5 and 6, and while the invention has particular advantages for dual spindle crankshaft lathes, it can be applied to multiple spindle lathes having more than two sets of spindles by simply increasing the number of transfer arms and bracket assemblies.

The brackets 70 and 71 are also provided with shafts 80 and 81, and the shaft 80 extends between the bearing brackets while the shafts 81 are relatively short and do not extend inwardly beyond the brackets. Mounted on the shafts 69 and 81 of the brackets 65, 66 and 70, 71 are oscillating arms 83, 84 and 85 in sets at each side of the machine to provide cooperating pairs of oscillating arms which are connected at their outer ends by horizontal rods 86, 87 and 88 respectively. The horizontal rod 87 connecting the intermediate pair of oscillating arms 84 (Figure 3) is slightly longer than the rods 86 and 88 for a purpose which will be later described.

The shafts 69 and 81 are provided with pinion gears 90 and 91 respectively, which are keyed to the shafts 69 and 81 to turn therewith. Suitable keys 93 are provided on the shafts 69 and 81 for rigidly connecting the arms 83, 84 and 85 to the shafts (Figure 3) likewise to turn therewith.

It will thus be seen, that the pairs of arms 83, 84 and 85 will oscillate or swing vertically about their pivot shafts 69 and 81, and in order to oscillate said arms to and fro in unison a drive mechanism is provided and is supported on the head stock 7 of each lathe. The drive mechanism comprises an electric motor 94 mounted on a base 95 affixed to the head stock 7 by bolts or the like 96. The armature shaft 97 of the electric motor 94 is drivingly connected to a gear speed reduction unit 98 by means of a coupling 99, and said gear reduction unit has its base 100 also secured to the base 95 (Figures 3 and 6).

The output shaft 101 of the speed reduction gear unit 98 projects into a gear housing 102, and is keyed to a tubular shaft 103 having a small pinion gear 104 formed thereon. The tubular shaft 103 is mounted in suitable bearings in the gear housing 102. Mounted in parallel relation with the cylindrical shaft 103 is a shaft 105 which has its ends mounted in bearings in the gear casing 102, and has the hub 106 of a gear 107 keyed thereto in the usual manner. The gears 104 and 107 are provided with teeth such that the total gear reduction of the armature shaft speed 97 will be approximately eight revolutions per minute. Thus, the shaft 105 will rotate at the above reduced speed and one end of said shaft projects from the gear casing 102 and is provided with a crank arm 108. A connecting rod 109 is secured to the crank arm 108 by means of a bearing stud 110 (Figure 6), and the opposite end of the connecting rod 109 is connected to a pair of spaced arms 111 by means of a pivot pin 112. The spaced arms 111 have their inner ends integrated with a hub 113 which is secured to one end of the rotary shaft 80. The rotary shaft 80 extends from one side of the mechanism to the other for supplying power to both sides and the oscillating arm of each pair as indicated in Figure 3.

Mounted on the shaft 80 adjacent each end thereof are quadrant gears 115 and 116 which have their hubs 117 and 118 respectively, keyed to the shaft 80 to turn therewith. The quadrant gear 115 is adapted to mesh with one of the pinions 91 on one side of the mechanism, while the other quadrant gear 116 is adapted to mesh with the pinion 91 on the other side of the mechanism.

Mounted on the shafts 68 adjacent the sides of the head and tail stocks are the hubs 119 of sector gears or quadrant gears 120 which are arranged to drivingly engage the pinion gears 90 on the short shafts 69 at each side of the mechanism. In order to drive the quadrant gears 115 and 120 in unison a connecting bar 121 at each side of the mechanism connects the quadrant gears 120 by pivot pins 122 (Figures 4 and 7) at the ends thereof, while the intermediate portion of each bar 121 is pivotally connected to the center quadrant gears 115 by pivot pins 123. Thus, when the motor 94 is energized the shaft 80 will be oscillated at a reduced speed which will oscillate the quadrant gears 115 thereon and through the link bar 121 will similarly oscillate the quadrant gears 120 at the ends of the mechanism. As the quadrant gears 115 and 120 are oscillated to and fro, the pairs of arms 83, 84 and 85 arranged one at each side of the mechanism, will oscillate in a reverse direction.

Suspended from the shafts 86, 87 and 88 is a pair of work engaging arms 124 and 125 (Figure 3) which have their bearing collars 126 and 127 rigidly affixed to the shafts 86, 87 and 88 to rotate therewith. The depending arms 124 are slightly longer in length than the arms 125, and are provided with hooked lower ends 128 to engage the flange end bearing of a crankshaft C. The shorter depending arms 125 are similarly provided with hooked lower ends 129 for engaging one of the connecting rod bearings adjacent the stub end of the crankshaft. Thus, it will be seen that the crankshafts C will be maintained in substantially the same position throughout their travel as they assumed on the loading station platform 22.

It is to be noted that the transverse shafts or rods 86, 87 and 88 are rotatably supported in suitable bearing bosses on the free swinging ends of the corresponding pairs of oscillating arms 83, 84 and 85 so that rotation of the rods 86, 87 and 88 about their axis in either direction will oscillate the suspended arms 124 and 125 correspondingly.

Secured to the intermediate portion of each of the horizontal rods 86, 87 and 88 is the bearing boss 130 which is keyed or otherwise secured in place to likewise turn with the shafts 86, 87 and 88. The bearing collar 130 is provided with spaced apart arms 131, and extending between each pair of arms 131 is an actuator bar 132 which is pivoted to the arms by pivot pins 133 (Figures 3 and 4). The structure thus provides for moving the depending arms 124 and 125 in parallel relation during the oscillating to and fro movement of the oscillating arms 83, 84 and 85.

It is to be noted, at this point that the arms 83, 84 and 85 at each side of the mechanism are oscillated through an arc slightly greater than 180 degrees, and that the gearing is arranged so that as the connecting rod 109 approaches a position in which the bearings 105, 110 and 112 are in alinement, the arms 83, 84 and 85 will travel at a reduced rate of speed and that said arms will travel more rapidly between the limits of their movement as the crank arm 108 moves away from one dead center position toward another dead center position displaced therefrom an angular distance to 180 degrees. This is the desired condition, since the hooks 128 and 129 are in a position at the ends of the oscillating movement of the arms to load and unload crankshafts and work pieces to the lathes and transfer the work pieces or crankshafts between the sets of spindles 13—17 and 14—18 of each lathe.

In order to guide the depending hooks 124 and 125 on each of the horizontal bars 86, 87 and 88 and maintain the same in parallelism until they reach the end of their stroke, a guide mechanism is provided which includes a pair of vertical castings 140 and 141 mounted on opposite sides of the drive mechanism (Figures 4 and 6). Each upright includes a base portion which is bolted or otherwise affixed to the top wall of the head stock 7 and extending upwardly from the base portion are triangular shaped web portions 142 arranged in spaced pairs connected by a lower front wall portion 143. Upper front wall portions 145 and 146 are removably connected to the spaced triangular webs 142 which terminate a short distance from the upper ends of the uprights 141. The space thus remaining between the upper ends of the face plates 145 and 146 provides a supporting recess 147 (Figure 3) in each of the uprights for supporting the ends of an arcuate plate 150 (Figure 4). The ends of the arcuate plate 150 are enlarged as at 151 and 152 and rest upon the upper edges of the face plates 145 and 146. Bolts or other fastening elements may be provided for securing the face plates 145 and 146, as well as the ends 151 and 152 of the arcuate plate 150 to the upright castings 140 and 141 respectively, (not shown). Formed in the arcuate plate 150 is a curved guideway 153 which passes through the face of the plates 151 and 152 (Figure 4), and the ends of the arcuate guideway 153 enter an enlarged guideway groove 154 in the face plate 145 and 155 in the face plate 146.

The arcuate guideway groove 153 is adapted to receive a guide roller 157 which is rotatably mounted on a bearing stud or the like 158 carried on the extreme free end of an oscillating lever 159 which has its hub portion 160 keyed to the shaft 87 as at 161. Thus, rocking movement applied to the oscillating lever 159 will cause the depending arms 124 and 125 to be correspondingly rocked about the axis of the shaft 87. However, when the oscillating arms 83, 84 and 85 are traveling through the uppermost portion of their stroke, the arcuate guide slot 153 maintains the lever 159 in an upright position so that the depending hook arms 124 and 125 will travel in parallelism.

Mounted in the enlarged recess 154 of the face plate 145 is a pivoted switch member 162 which is mounted on a pin 163 to turn therewith. The pin 163 extends through a bearing opening 164 (Figure 5) in the floor of the face plate 145 and projects a slight distance therebeyond for receiving the hub or collar 165 of an actuating arm 166 (Figures 4 and 5). The arm 166 is yieldingly urged downwardly by means of a spring pressed plunger 167 slidably mounted in a casing 168 (Figure 5). A coil spring 169 has one end arranged in abutting relation with the upper enlarged end 170 of the plunger 167, while the opposite end is engaged by an adjusting screw 171. The trip member 162 is provided with curved upper and lower switching portions 174 and 175 such that when the switching member 162 assumes its normal position (Figure 4) it will engage the right hand wall of an enlarged recess 154 and provide an offset curved trackway 176. Thus, when the guide roller 157 travels to the left through the guide slot 153, it will enter the enlarged guideway 154 on the left side of the switching lever 174 and will follow the trackway 176 formed between said lever and the left wall of said enlarged recess to rock the actuating lever 159 and the depending work-engaging and supporting hooks 124 and 125. This rocking motion causes the lower hooked ends 128 to engage a crankshaft on the table 22, as well as on the table 28, and simultaneously move the lower ends of the work-engaging hooks 128 and 129 into engagement with crankshafts being turned between the spindles 13—17 and 14—18. As the guide roller 157 approaches the lower end 175 of the switching lever 162, the hooked ends 128 and 129 swing into their engaging positions to extend beneath crankshafts C on the tables 22 and 28 and also beneath crankshafts in the lathes 5 and 6 supported between the spindles 13—17 and 14—18. As the roller reaches the bottom of its travel and the mechanism is moved upwardly by the oscillation of the arms 83, 84 and 85 in a reverse direction, said roller will travel through the passageway 178 between the switching lever 162 and the right wall of the enlarged recess 154 until it strikes the upper end 174 of the switching lever. As the guide roller 157 engages the upper end of the switching lever 174, said upper end is moved to the left against the yielding action of the coil spring 169, and by reason of the fact that the upper end of the switching lever 174 is thus yieldingly moved out of the path, the roller 157 will enter the left end of the arcuate guide slot 153. In this position, each pair of work supporting hooks 128 and 129 will have received therein a crankshaft C (Figure 4).

When the guide roller 157 reaches the end of the guide slot 153 while traveling to the right, it enters the enlarged guide recess 155 in which there is pivotally mounted a switching lever 180 which has a boss 181 formed thereon to which is attached a short shaft 182, which like the shaft 163 extends through the rear wall of the plate 146 and is provided with an arm 183. The arm 183 is engaged by the lower end of a plunger 184 which is yieldingly urged downwardly by means of a coil spring 185 housed within a suitable receptacle similar to the housing 168. Thus, the switching lever 180 is normally urged in a direction such that the upper end 186 of the switching lever will be held adjacent the left wall 187 of the enlarged recess 155 (Figure 4), and the lower end of said lever is curved as at 188 and is normally urged in the direction of the right hand wall 189 of the enlarged guideway 155 under the influence of the coil spring 185. With the switch lever 180 in the position shown in Figure 4, the guide roller 157 will enter the enlarged recess 155 between the wall 189 and the curved wall of the switch lever end 186. When the roller approaches the bottom or curved portion 190 of the enlarged guide recess 155, it follows the curvature of the lower wall and will rock the lever 159 about the axis of the shaft 87 and through the linkage 132 will rock the arms 131 and thus cause the depending arms 124—125 and hooked ends 128—129 to swing in a direction to release the crankshafts supported thereby. As the guide roller 157 approaches the portion of the guide slot 155 on the opposite side of the switch lever 180, the depending arms 124 and 125 will be rocked to their normal vertical position as the roller 157 passes between the end 186 of the switch lever 180, and the left wall 187 of the enlarged guideway 155. As the guide roller 157 enters the right end of the arcuate guide slot 153, the depending arms 124—125 and work-engaging hooks 128—129 are restored to a true vertical position.

It will be seen, that the depending levers 124—125 are rocked about their pivot axis 86, 87 and 88 as the pair of arms 83, 84 and 85 approach the limits of their oscillatory to and fro travel. The upper end 186 of the switch lever 180 is moved to the right when the guide roller 157 travels upwardly toward the entrance of the guide slot 153 under the yielding action or against the spring tension of the coil spring 185. The tripping levers 162 and 180 produce the rocking motion of the depending levers 124—125 and hooks 128—129 during the travel of the oscillating levers 83, 84 and 85 when said oscillating levers are traveling slowly at the ends of their stroke. This enables the work pieces to be slowly engaged and disengaged and to be carefully and slowly positioned between the lathe centers 13—17 and 14—18 while the crankshafts C are being fed or unloaded from the lathes, as well as when the crankshafts are transferred from one set of spindles to the other.

For consideration of the operation of the invention, it will be assumed that a plurality of crankshafts C have been positioned on the inclined work table 22 in advance of the lathe 5, and that the motors 94 of the lathes 5 and 6 have been energized to set in motion the oscillatory to and fro movement of the vertically swinging levers 83, 84 and 85. It being understood, that the transfer mechanism for each lathe 5 and 6 is identical in construction and operation, and thus the description above of one transfer mechanism will suffice for both. After the motors 94 have been energized to cause oscillation of the arms 83, 84 and 85 it will be noted that the depending arms 124 and hooks 128 thereon are in a position (Figure 4) to engage a work piece on the table 22 or the table 28 and in addition engage under the crankshafts between the lathe spindles 13—17 and 14—18. With the work-engaging hooks 128—129 in position as shown in Figure 1, left hand side of the drawing, the guide roller 157 (Figure 4) will have reached the lower end of its travel and will have started its upward travel as shown in Figure 4. This motion causes the depending arms 124—125 to rock the hooks 128—129 so as to position the same under the work, and transfer it between the spindles 13 and 17 of the lathe 5.

Attention is directed to the fact that the transfer mechainsm is actuated only after the machining cycle is completed and the spindles stopped in proper predetermined index. With the spindles in proper index the transfer mechanism is actuated to complete the transfer cycle, and the machining cycle then follows in proper sequence.

In the transfer cycle the drive motor 94 is first energized and the arms 124 and 125 engage the first crankshaft C from the table 22 and transfer it between the spindles 13 and 17 of the crankshaft lathe 5 and immediately, the lathe centers 13 and 17 will move inwardly to engage the ends of the crankshaft and the transfer arms move to disengaged position to complete the transfer cycle, and the chucking device 15 of the lathe 5 will then engage the crankshaft to rotate the same, and after the first crankshaft has been turned the motor 94 is again energized to return the arms 83, 84 and 85 to position shown in Figure 4, so that the hooks 128—129 will engage beneath another crankshaft C on the rack 22. As the arms 83 swing upwardly, the hooks 128—129 supported by the arms 84 will have been moved under the crankshaft C simultaneously with the lifting of the crankshaft C from the table 22. As the motion of the arms 83 and 84 continues, the roller 157 will be guided through the guide slot 153 so that the crankshaft will be transferred from the position between the lathe centers 13 and 17 of the lathe 5 to the centers 14 and 18 thereof. With the arms 83 and 84 and their corresponding hooks 128—129 moved to deposit a new crankshaft between the lathe centers 13 and 17 and to transfer the crankshaft from said centers to the lathe centers 14 and 18 the roller 157 will have reached the curved portion 190 of the enlarged recess 155, and the arms 83 and 84 will be oscillated in an opposite direction which will cause the roller 157 to travel along the left side of the switch block 186 and rock the depending levers 124—125 so as to disengage the hooks from the crankshafts deposited between the centers 13 and 17 and 14—18 of the lathe 5. During the return travel to vertical position, the hooks 128—129 of the oscillating levers 83 and 84 will be unloaded. Upon completion of the machining cycle the roller 157 travels down until it reaches the enlarged portion 154 of the guide slot, at which time the roller will ride down the left side of the upper end 174 of the switching lever 162 and will cause the hooks 128—129 of the oscillating levers 83 to engage another crankshaft on the table 22, and similarly, will cause the hooks 128—129 supported by the oscillating levers 84 to engage beneath a crankshaft between the centers 13 and 17 of the lathe 5, and will simultaneously cause the hooks 128—129 to engage beneath a crankshaft C between the lathe centers 14 and 18 of the lathe 5.

As shown in Figure 4, the hooks 128—129 suspended from the oscillating arms 83, 84, 85 are in position to pick up a crankshaft from the table 22 and engage between crankshafts between the lathe centers 13—17 and 14—18. Upon oscillation of the levers 83, 84 and 85 in a reverse direction, a new crankshaft is inserted between the lathe centers 13 and 17 and the crankshaft between the lathe centers 13 and 17 is transferred to the lathe centers 14 and 18 of the lathe 5. Simultaneously, the crankshaft between the lathe centers 14 and 18 will be removed and will be deposited upon the loading rack 36 between the lathes 5 and 6. Thus, crankshafts deposited upon the rack bars 36 of the loading and unloading station 128 will be presented for being picked up by the hooks 128—129 on the oscillating arms 83, supported by the second crankshaft lathe 6 for being transferred between the lathe centers 13—17. As the lathes 5 and 6 operate and the transfer mechanism progresses the crankshafts from their position between one set of lathe centers to the other, and thence to the next lathe for similar progression, the crankshafts will be turned for rough cutting and finishing, and finally, the finished crankshafts will be deposited upon the unloading station 43 by the hooks 128—129 supported by the oscillating arms 85 of the transfer mechanism on the lathe 6.

It will thus be seen, that with the shaft 105 of the gearing unit (Figure 6) being rotated at approximately 8 revolutions per minute, the arms 83, 84 and 85 will oscillate to and fro or make one complete movement in approximately 15 seconds. In other words, it will require 7 and one-half seconds for the crankshaft to be transferred from the loading station to the lathe centers, and from one set of lathe centers to the other, the arms are then returned to original starting position, after which the crankshafts are operated upon by the various cutting tools 19-20 to complete the machining cycle. During this machining cycle the various portions of the crankshaft are turned by various sets of tools presented to different surfaces such as is indicated at 19 and 20.

It is to be understood that the form of the invention herewith shown and described is to be taken as a preferred embodiment thereof, and that various changes in the shape, size and arrangement of parts may be resorted to without departing from the spirit of the invention or the scope of the subjoined claims.

We claim:

1. In combination with a series of multiple spindle lathes of uniform height from the bottoms thereof to the spindles thereof arranged in spaced relation, work feeding and receiving stations and including horizontal feeding and receiving racks alternately arranged between said lathes and a substantially identical transfer mechanism for each lathe, including a series of oscillating arms, work engaging hooks suspended from said arms, means for oscillating said arms to and fro in unison through an identical path of travel to deposit, transfer and discharge work pieces with respect to the centers of said multiple lathes, and means for rocking said hooks to cause the same to engage and disengage work pieces during their progressive travel through the lathe and to and from said work feeding stations, and means for vibrating said work feeding and receiving stations to move the workpieces deposited thereon in a direction toward another lathe.

2. In a transfer mechanism for multiple spindle crankshaft lathes, a series of oscillating arms rockably mounted on the head and tail stocks of a lathe to swing in a vertical plane, a drive motor for said arms, speed reduction gearing connected to said drive motor, a mechanical motion device for converting rotary motion to oscillatory motion drivingly connecting said speed reduction gearing to said arms, work engaging members having hooks to support the crankshafts from beneath rigidly suspended between corresponding sets of oscillating arms at each side of the transfer mechanism, means connecting said arms for oscillatory movement in unison one with the other, means pivotally supported by said arms connecting said hooks to move them in unison, an arm connected thereto having a roller adapted to travel in a cam pathway to maintain the hooks in a vertical position during their oscillatory travel between their limits of movement, and switch devices rockably mounted at the ends of said cam pathway and guiding the travel of the roller in the ends of the pathway to rock the means connecting the hooks and thereby to rock the hooks in under and out from under the crankshaft when the hooks reach the limits of their oscillatory movement, whereby crankshafts will be loaded between a first set of lathe spindles simultaneously with the displacement therefrom of a crankshaft for being transferred between another set of lathe spindles, and simultaneously with the discharge of a crankshaft from a position between the last set of lathe spindles to an unloading station.

3. In a transfer mechanism for a crankshaft lathe, sets of oscillating arms rockably supported on the head and tail stocks of said lathe to swing in a vertical plane, work-engaging members connected to said arms having hooks to support the work from beneath, automatic means for rocking said work engaging members independently of said arms previous to the engagement of said work by said members to cause said hooks to swing under the workpieces when the arms are in the forward position and to swing out from under the workpieces when the arms are in the rearward position, and means for oscillating said arms to transport the work to and from the lathe.

4. In a transfer mechanism for a crankshaft lathe, sets of oscillating arms rockably supported on the head and tail stocks of said lathe to swing in a transverse vertical plane, work engaging members suspended from and freely pivotal relative to said arms, said members having hooks to support the work from beneath, automatic means remote from said arms for rocking said work-engaging members independently of said arms to cause said hooks to swing under the work-pieces when the arms are in the forward position and to swing out from under the workpieces when the arms are in the rearward position, and means for oscillating said arms to transport the work to and from the lathe.

5. In a transfer mechanism for crankshaft lathes, pairs of oscillating arms rockably supported on the head and tail stocks of a lathe to swing in a vertical plane, rods pivotally supported by said arms connecting each pair of arms, a pair of work-engaging members having offset re-curved hooks to support crankshafts from beneath rigidly suspended on said rods between each pair of oscillating arms, means connecting said hooks in parallelism pivotally connecting to said rods, and automatic means for guiding said work-engaging members in a vertical position throughout the intermediate portion of their oscillatory travel and for rocking said rods to move said hooks in under and out from under the crankshafts at the limits of their oscillatory movement.

6. In a transfer mechanism for crankshaft lathes, a series of oscillating arms rockably mounted on the head and tail stocks of a lathe to swing in a vertical plane, a drive motor for said arms, speed reduction gearing connected to said drive motor, a mechanical motion device for converting rotary motion to oscillatory motion drivingly connecting said speed reduction gearing to said arms, work-engaging members having hooks to support the crankshafts from beneath rigidly suspended between corresponding sets of oscillating arms at each side of the transfer mechanism, means connecting said arms for oscillatory movement in unison one with the other, means pivotally supported by said arms connecting said hooks to move them in unison, an arm connected thereto having a roller adapted to travel in a cam pathway to maintain the hooks in a vertical position during their oscillatory travel between their limits of movement, and switch devices rockably mounted at the ends of said cam pathway and guiding the travel of the roller in the ends of the pathway to rock the member connecting the hooks and thereby to rock the hooks in under and out from under the crankshafts when the hooks reach the limits of their oscillatory movement.

7. In a transfer mechanism for crankshaft lathes, pairs of oscillating arms rockably supported on the head and tail stock of a lathe to swing in a vertical plane, rods pivotally supported by said arms connecting each pair of arms, a pair of work-engaging members having hooks to support crankshafts from beneath rigidly suspended on said rods between each pair of oscillating arms, means connecting said hooks in parallelism pivotally connecting to said rods, means for guiding said work-engaging members in a vertical position throughout the intermediate portion of their oscillatory travel and for rocking said rods to move said hooks in under and out from under the crankshafts at the limits of their oscillatory movement, and automatic means driving the arms to transport the work which moves said arms at a reduced rate of speed at the limits of their oscillatory travel.

8. In a transfer mechanism for crankshaft lathes, a series of oscillating arms rockably mounted on the head and tail stocks of a lathe to swing in a vertical plane through arcs of approximately 180°, a drive motor for said arms, speed reduction gearing connected to said drive motor, a mechanical motion device for converting rotary motion to oscillatory motion and driving said arms at a reduced rate of speed at their oscillatory limits drivingly connecting said speed reduction gearing to said arms, work-engaging members having hooks to support the crankshafts from beneath rigidly suspended from corresponding sets of oscillating arms at each side of the transfer mechanism, means connecting said arms for oscillatory movement in unison one with the other, means pivotally supported by said arms connecting said hooks to move them in unison, an arm connected thereto having a roller adapted to travel in a cam pathway to maintain the hooks in a vertical position during their oscillatory travel between their limits of movement, and switch devices rockably mounted at the ends of said cam pathway and guiding the travel of the roller in the ends of the pathway to rock the means connecting the hooks and thereby to rock the hooks in under and out from under the crankshafts when the hooks reach the limits of their oscillatory movement.

9. The combination defined in claim 8 in which said mechanical motion device comprises a crank arm connected to said speed reduction gearing, a connecting arm thereon, a drive arm on the connecting arm, a drive shaft below the axis of said crank arm connected to said drive arm and oscillated thereby, quadrant gears on said drive shaft, and pinion gears on said oscillating arms in mesh therewith to move said oscillating arms through a defined path of travel.

10. In a transfer mechanism for crankshaft lathes, longitudinally spaced pairs of oscillating arms rockably supported on the head and tail stocks of the lathe to swing in a vertical plane, transversely spaced, pivotal rods connecting said pairs of arms, work-engaging members having hooks to support the work from beneath rigidly suspended from said rods, a transverse plate mounted on said lathe having an arcuate cam track formed therein with offset, enlarged lower ends, means for oscillating said arms in unison, means connecting said work-engaging members, a crank arm rigid on one of said rods having means guiding in said track, arcuately shaped switch cams pivotally disposed in the enlarged ends of said track and normally guiding the means on the end of said crank arm at the limits of the oscillating arms movement outwardly of the arcuate path into said enlarged ends to rock said rods and thereby said hooks in under and out from under the work, and spring-pressed plungers to return said switch cams to normal position when they are pivoted out of normal position by the means on the crank arm resuming the arcuate path after said rocking action.

11. In a transfer mechanism for crankshaft lathes, longitudinally spaced pairs of oscillating arms rockably supported on the head and tail stocks of the lathe to swing in a vertical plane, transversely spaced, pivotal rods connecting said pairs of arms, work-engaging members having hooks to support the work from beneath rigidly suspended from said rods, a transverse plate mounted on said lathe having an arcuate cam track formed therein with offset enlarged lower ends, a motor, speed reduction gearing drivingly connected thereto, a crank arm connected to said speed reduction gearing, a connecting arm thereon, a drive arm on the connecting arm, a drive shaft below the axis of said crank arm connected to said drive arm and oscillated thereby, quadrant gears on said drive shaft, and pinion gears on said oscillating arms in mesh therewith to move said oscillating arms through a defined path of travel, means connecting said work-engaging members, a crank arm rigid on one of said rods having means guiding in said track, arcuately shaped switch cams pivotally disposed in the enlarged ends of said track and normally guiding the means on the end of said crank arm at the limits of the oscillating arms movement outwardly of the arcuate path into said enlarged ends to rock said rods and thereby said hooks in under and out from under the work, and spring-pressed plungers to return said switch cams to normal position when they are pivoted out of normal position by the means on the crank arm resuming the arcuate path after said rocking action.

12. In a transfer mechanism for crankshaft lathes, transversely spaced rods pivotally supported between the head and tail stocks of a lathe, work-engaging members having hooks to support the work from beneath rigidly suspended from said rods, a transverse plate on said lathe having an arcuate cam track formed therein with offset lower ends, means connecting said work-engaging members, means rigidly connecting one of said rods with a guide in said trackway, and means for moving said rods in unison to transport the work when said guide is moving in the arcuate portion of the cam track and to rock said rods and thereby said work-engaging members to swing said hooks in under and out from under the work when said guide enters the offset lower ends of said cam track.

13. In a transfer mechanism for crankshaft lathes, pairs of oscillating arms rockably supported on the head and tail stocks of said lathe to swing in a vertical plane, work-engaging members between said arms having offset, re-curved hooks to support the work from beneath pivotally connected to said arms, automatic means for rocking said work-engaging members independently of said arms previous to the engagement of said work by said members to cause said arms to swing in under the workpieces when the arms are in the forward position and to swing out from under the workpieces when the arms are in the rearward position, a motor, speed reduction gearing drivingly connected thereto, a crank arm connected to said speed reduction gearing, a connecting rod thereon, a drive arm on the connecting arm, a drive shaft below the axis of said crank arm connected to said drive arm and oscillated thereby, quadrant gears on said drive shaft, transverse rods connected to said quadrant gears and extending therefrom, other quadrant gears connected to the ends of said rods, and pinion gears on said oscillating arms in mesh with said quadrant gears to move said oscillating arms in unison through a defined path of travel.

14. In a transfer mechanism for crankshaft lathes, pairs of oscillating arms rockably supported on the head and tail stocks of said lathe to swing in a vertical plane, work-engaging members between said arms, a motor, speed reduction gearing drivingly connected thereto, a crank arm connected to said speed reduction gearing, a connecting rod thereon, a drive arm on the connecting arm, a drive shaft below the axis of said crank arm connected to said drive arm, and oscillated thereby, quadrant gears on said drive shaft, transverse rods connected to said quadrant gears and extending therefrom, other quadrant gears connected to the ends of said rods, and pinion gears on said oscillating arms in mesh with said quadrant gears to move said oscillating arms in unison through a defined path of travel.

15. In a transfer mechanism for crankshaft lathes, pairs of oscillating arms rockably supported on the head and tail stocks of said lathe to swing in a vertical plane, work-engaging members between said arms, a motor, speed reduction gearing drivingly connected thereto, a drive shaft, means interposed between said speed reduction gearing and shaft for reducing rotary motion to oscillatory motion, quadrant gears on said drive shaft, transverse rods connected to said quadrant gears and extending therefrom, other quadrant gears connected to the ends of said rods, and pinion gears on said oscillating arms in mesh with said quadrant gears to move said oscillating arms in unison through a defined path of travel.

16. In a transfer mechanism for crankshaft lathes, transversely spaced, longitudinally disposed members supported between the head and tail stocks of a lathe, work-engaging arms having hooks to support the work from beneath rigidly suspended from said members, means for moving said members to-and-fro transversely in unison to transport the work to and from the lathe, and means remote from said hooks for automatically rocking said members and thereby said hooks to swing said hooks in under the work and out from under the work at the limits of travel of said members.

17. In combination with a series of spaced-apart, multiple spindle lathes of uniform height, the spindles of which are in substantially the same horizontal plane, said lathes being arranged along a work pathway, work feeding and receiving stations including horizontal feeding and receiving racks arranged alternately between said lathes, and a substantially identical work transfer mechanism on each lathe for progressively feeding work pieces to the centers of the lathes from the feeding stations and from one set of lathe spindles to another, and means for causing the work feeding and receiving stations to vibrate and move the workpieces deposited thereon in a direction toward the next succeeding lathe.

18. In a transfer mechanism for crankshaft lathes, pairs of oscillating arms rockably supported on the head and tail stocks of said lathe to swing in a vertical plane, work-engaging members between said arms pivotally connected to said arms, the work engaging members having hooks to support the work from beneath, automatic means for rocking said work-engaging means independently of said arms previous to the engagement of said work by said members to cause said hooks to swing in under the workpieces when the arms are in the forward position and to swing out from under the workpieces when the arms are in the rearward position, and means driving the arms to transport the work, said last-mentioned means moving said arms at a reduced rate of speed as they approach the limits of their oscillatory travel.

19. In a transfer mechanism for crankshaft lathes, pairs of oscillating arms rockably supported on the head and tail stocks of said lathe to swing in a vertical plane, work-engaging members suspended from said arms and freely pivotal relative thereto, the work engaging members having hooks to support the work from beneath, automatic means remote from said hooks for rocking said work-engaging members to cause said hooks to swing in under the workpieces when the arms art in the forward position and to swing out from under the workpieces when the arms are in the rearward position, and means driving the arms to transport the work, said last-mentioned means moving the arms at a reduced rate of speed at the limits of their oscillatory travel.

20. In a transfer mechanism for a multiple spindle crankshaft lathe, a series of oscillating arms rockably supported on the head and tail stocks of said lathe to swing in a vertical plane, work engaging members having offset recurved hooks to support the work from beneath, said work engaging members being pivotally connected to said arms, automatic means remote from said arms for rocking said work engaging members independently of said arms to cause the hooks to swing under the work pieces when the arms are in one position and to swing out from under the work pieces when the oscillating arms are in another position, and means for oscillating said arms in unison to swing the arms through an identical path of travel and feed the workpieces to and between the spindles of the multiple spindle lathe.

21. In a transfer mechanism for a multiple spindle crankshaft lathe, a series of oscillating arms rockably supported on the head and tail stocks of a lathe to swing in a vertical plane, sets of crankshaft engaging members having offset recurved hooks to support the work from beneath, the sets of crankshaft engaging members being suspended from and freely pivotal relative to said arms, means for oscillating said arms in unison, an arcuate cam track, means including a member guiding in said track connecting said sets of crankshaft engaging hooks for operation in unison, said track being shaped to permit said hooks to move in parallelism during their travel between the limits of oscillatory movement of said arms and to rock said hooks independently of said arms at one end of the movement of said oscillating arms to cause the hook portions to swing under the crankshafts being fed to said lathe, the track also being shaped to move said hooks out of crankshaft engaging position at the opposite limit of the oscillatory movement of said arms.

References Cited in the file of this patent

UNITED STATES PATENTS

| | | |
|---|---|---|
| 1,794,424 | Smith et al. | Mar. 3, 1931 |
| 1,933,225 | E. R. Smith | Oct. 31, 1933 |
| 1,950,040 | Smith et al. | Mar. 6, 1934 |
| 2,004,540 | Smith et al. | June 11, 1935 |
| 2,040,028 | Smith et al. | May 5, 1936 |
| 2,233,309 | Groene | Feb. 25, 1941 |
| 2,305,868 | Groene et al. | Dec. 22, 1942 |
| 2,404,830 | Dempster | July 30, 1946 |
| 2,445,106 | Dempster | July 13, 1948 |